(12) United States Patent
Cole et al.

(10) Patent No.: US 9,046,196 B2
(45) Date of Patent: Jun. 2, 2015

(54) POLYETHYLENE COMPOSITION FOR LARGE DIAMETER PIPE STABILITY

(75) Inventors: Brian Cole, Kingwood, TX (US); John Ashbaugh, Houston, TX (US)

(73) Assignee: FINA TECHNOLOGY, INC., Houston, TX (US)

(*) Notice: Subject to any disclaimer, the term of this patent is extended or adjusted under 35 U.S.C. 154(b) by 772 days.

(21) Appl. No.: 13/004,315

(22) Filed: Jan. 11, 2011

(65) Prior Publication Data

US 2012/0175008 A1 Jul. 12, 2012

(51) Int. Cl.
*D01F 1/02* (2006.01)
*F16L 9/127* (2006.01)

(52) U.S. Cl.
CPC .................................... *F16L 9/127* (2013.01)

(58) Field of Classification Search
USPC ........ 264/211, 36.15, 36.16, 36.17, 632, 512, 264/563, 573
See application file for complete search history.

(56) References Cited

U.S. PATENT DOCUMENTS

| | | | |
|---|---|---|---|
| 4,692,539 A * | 9/1987 | Spivack | 558/78 |
| 4,987,018 A | 1/1991 | Dickinson et al. | |
| 5,028,376 A | 7/1991 | Vanderwoude | |
| 5,102,611 A * | 4/1992 | Wolfe et al. | 264/568 |
| 5,266,616 A | 11/1993 | Wolfe | |
| 6,174,971 B1 | 1/2001 | Chen | |
| 6,693,058 B1 * | 2/2004 | Gray et al. | 502/103 |
| 6,878,784 B1 | 4/2005 | Asumalahti et al. | |
| 7,345,113 B2 | 3/2008 | VanDun | |
| 2003/0085486 A1 * | 5/2003 | Kasai et al. | 264/171.13 |
| 2003/0109611 A1 * | 6/2003 | Schrinner et al. | 524/111 |
| 2003/0225194 A1 * | 12/2003 | Coffy et al. | 524/115 |
| 2004/0152807 A1 | 8/2004 | Stadler | |
| 2008/0051538 A1 * | 2/2008 | Coffy et al. | 526/170 |
| 2010/0003439 A1 | 1/2010 | Michie, Jr. et al. | |

* cited by examiner

Primary Examiner — Stella Yi

(57) ABSTRACT

Pipe articles and methods of forming the same are described herein. The methods generally include providing an ethylene based polymer; contacting the ethylene based polymer with a secondary stabilizer including a diphosphite to form a modified polyethylene; and forming the modified polyethylene into a pipe.

20 Claims, 1 Drawing Sheet

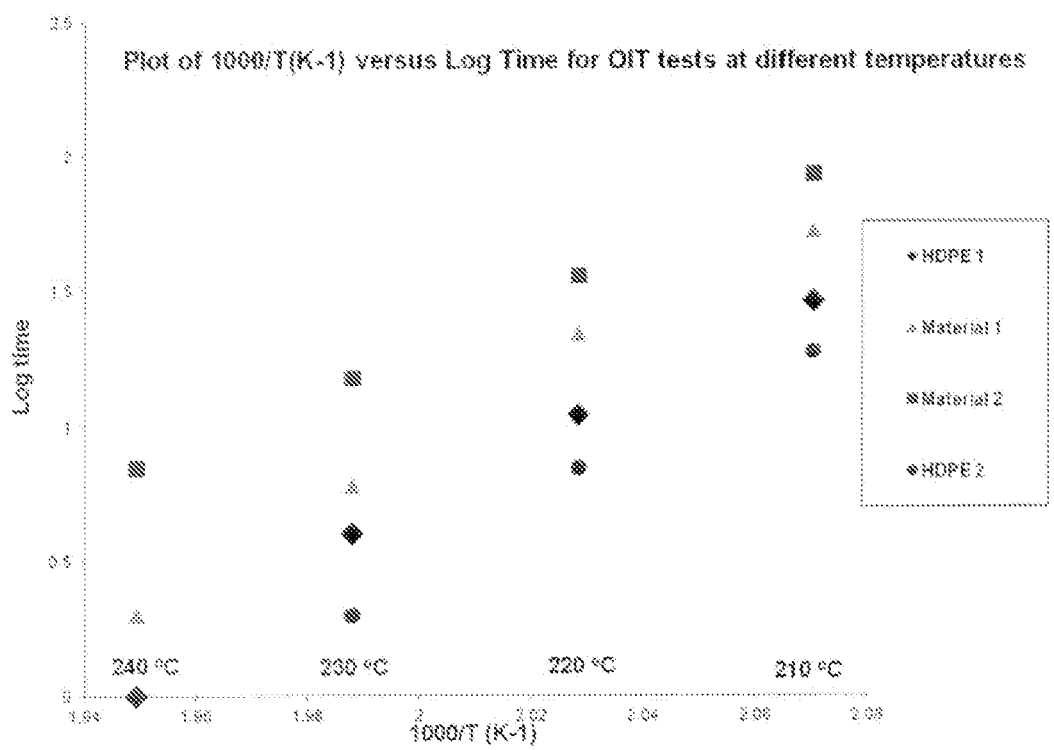

POLYETHYLENE COMPOSITION FOR LARGE DIAMETER PIPE STABILITY

FIELD

Embodiments of the present invention generally relate to pipes formed from polyethylene.

BACKGROUND

According to the American Gas Association, the total miles of plastic piping in use in natural gas distribution systems in the United States grew from about 9200 miles in 1965 to more than 215,000 miles by 1982, of which, more than 85 percent was formed of polyethylene. While plastic piping, such as polyethylene pipe, is widely accepted as a safe and economical alternative to piping formed from steel for the transportation of gas, such as fuel gas and/or natural gas, a number of pipeline accidents involving plastic pipe have resulted from cracking due to brittle failure.

Therefore, a need exists to form polyethylene pipe resistant to cracking.

SUMMARY

Embodiments of the present invention include methods of forming pipe. The methods generally include providing an ethylene based polymer; contacting the ethylene based polymer with a secondary stabilizer including a diphosphite to form a modified polyethylene; and forming the modified polyethylene into a pipe.

In one or more embodiments, the pipe of the preceding paragraph includes a diameter of at least 8 inches and an Oxidative Induction Time (OIT) of at least 30 minutes at 230° C.

In one or more embodiments, the method of any preceding paragraph further includes contacting the ethylene based polymer with a primary stabilizer to form the modified polyethylene.

One or more embodiments include the method of any preceding paragraph, wherein the pipe is a gas distribution pipe and the method further includes flowing a gas through the gas distribution pipe.

One or more embodiments include the method of the preceding paragraph, wherein the gas is selected from fuel gas and natural gas.

One or more embodiments include the method of any preceding paragraph, wherein the ethylene based polymer exhibits a bimodal molecular weight distribution.

One or more embodiments include the method of any preceding paragraph, wherein the ethylene based polymer is formed by a Ziegler-Natta catalyst.

One or more embodiments include the method of the preceding paragraph, wherein the ethylene based polymer is formed in a plurality of loop reactors in series.

One or more embodiments include the method of any preceding paragraph, wherein the ethylene based polymer is formed by a Ziegler-Natta catalyst formed by contacting an alkyl magnesium compound with an alcohol to form a magnesium dialkoxide compound and contacting the magnesium dialkoxide compound with successively stronger chlorinating agents.

One or more embodiments include the method of any preceding paragraph, wherein the Ziegler-Natta catalyst is formed by contacting an alkyl magnesium compound with an alcohol to form a magnesium dialkoxide compound; contacting the magnesium dialkoxide compound with a plurality of first agents to form reaction product "A"; contacting reaction product "A" with a second agent to form reaction product "B", wherein the second agent includes a transition metal and a halogen; contacting reaction product "B" with a third agent to form reaction product "C", wherein the third agent includes a first metal halide and wherein the third agent is a stronger halogenating agent than the second agent; optionally contacting reaction product "C" with a fourth agent to form reaction product "D", wherein the fourth agent comprises a second metal halide and wherein the fourth agent is a stronger halogenating agent than the third agent; and contacting reaction product "D" with fifth agent to form a Ziegler-Natta catalyst component, wherein the fifth agent includes an organoaluminum compound.

One or more embodiments include the method of any preceding paragraph, wherein the ethylene based polymer includes high density polyethylene.

One or more embodiments include the method of any preceding paragraph, wherein the secondary stabilizer is selected from trisarylphosphite, bis(2,4-di-tert-butylphenyl) pentaerythritol diphosphite, bis(phenyl)pentaerythritol diphosphite, bis(2,6-di-tert-butyl-4-methylphenyl)pentaerythritol diphosphite, bis(2,4-cumylphenyl)pentaerythritol diphosphite, 2,4,5-tri-t-butylphenyl 2-butyl-2-ethyl-1,3-propanediol phosphate and combinations thereof.

One or more embodiments include the method of any preceding paragraph, wherein the secondary stabilizer includes bis(2,6-di-tert-butyl-4-methylphenyl)pentaerythritol diphosphite.

One or more embodiments include the method of any preceding paragraph, wherein the primary stabilizer includes a sterically hindered phenol.

One or more embodiments include the method of any preceding paragraph, wherein the primary stabilizer is selected from thiobisphenols, alkylidene-bisphenols, alkylphenols, hydroxybenzyl compounds, acylaminophenols, hydroxyphenylpropionates, secondary aromatic amines and combinations thereof.

One or more embodiments include the method of any preceding paragraph, wherein the ethylene based polymer is contacted with from about 500 ppm to about 5000 ppm of the secondary stabilizer.

One or more embodiments include the method of any preceding paragraph, wherein the ethylene based polymer is contacted with from about 100 ppm to about 5000 ppm of the primary stabilizer.

One or more embodiments include the method of any preceding paragraph, wherein the primary stabilizer and secondary stabilizer are blended with one another prior to contact with the ethylene based polymer.

One or more embodiments include a pipe formed by the method of any preceding paragraph.

One or more methods include providing an ethylene based polymer; contacting the ethylene based polymer with a primary stabilizer and a secondary stabilizer to form modified polyethylene, wherein the secondary stabilizer comprises a diphosphite; and forming the modified polyethylene into a pipe, wherein the pipe includes a diameter of at least 8 inches and an Oxidative Induction Time (OIT) of at least 30 minutes at 230° C.

BRIEF DESCRIPTION OF DRAWINGS

FIG. 1 illustrates a plot of time versus OIT of various polymer samples.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Embodiments of the invention generally include pipes formed from bimodal polyethylene.

Catalyst Systems

Catalyst systems useful for polymerizing olefin monomers include any catalyst system known to one skilled in the art. For example, the catalyst system may include metallocene catalyst systems, single site catalyst systems, Ziegler-Natta catalyst systems or combinations thereof, for example. As is known in the art, the catalysts may be activated for subsequent polymerization and may or may not be associated with a support material. A brief discussion of such catalyst systems is included below, but is in no way intended to limit the scope of the invention to such catalysts.

For example, Ziegler-Natta catalyst systems are generally formed from the combination of a metal component (e.g., a catalyst) with one or more additional components, such as a catalyst support, a cocatalyst and/or one or more electron donors, for example.

A specific example of a Ziegler-Natta catalyst includes a metal component generally represented by the formula:

$$MR^A_x;$$

wherein M is a transition metal, $R^A$ is a halogen, an alkoxy or a hydrocarboxy group and x is the valence of the transition metal. For example, x may be from 1 to 4.

The transition metal may be selected from Groups IV through VIB (e.g., titanium, vanadium or chromium), for example. $R^A$ may be selected from chlorine, bromine, carbonates, esters, or alkoxy groups in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with a Ziegler-Natta activator (Z-N activator), which is also referred to in some instances as a "cocatalyst." Embodiments of such Z-N activators include organoaluminum compounds, such as trimethyl aluminum (TMA), triethyl aluminum (TEAl) and triisobutyl aluminum (TIBAl), for example.

The Ziegler-Natta catalyst system may further include one or more electron donors, such as internal electron donors and/or external electron donors. Internal electron donors may be used to reduce the atactic form of the resulting polymer, thus decreasing the amount of xylene solubles in the polymer. The internal electron donors may include amines, amides, esters, ketones, nitriles, ethers, phosphines, diethers, succinates, phthalates, or dialkoxybenzenes, for example. (See, U.S. Pat. No. 5,945,366 and U.S. Pat. No. 6,399,837, which are incorporated by reference herein.)

External electron donors may be used to further control the amount of atactic polymer produced. The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexymethyldimethoxysilane (CDMS), diisopropyldimethoxysilane and/or dicyclopentyldimethoxysilane (CPDS), for example. The external donor may be the same or different from the internal electron donor used.

The components of the Ziegler-Natta catalyst system (e.g., catalyst, activator and/or electron donors) may or may not be associated with a support, either in combination with each other or separate from one another. The Z-N support materials may include a magnesium dihalide, such as magnesium dichloride or magnesium dibromide, or silica, for example.

In one specific embodiment, the Ziegler-Natta catalyst is formed by contacting a magnesium dialkoxide compound with sequentially stronger chlorinating and/or titanating agents. For example, the Ziegler-Natta catalyst may include those described in U.S. Pat. No. 6,734,134 and U.S. Pat. No. 6,174,971, which are incorporated by reference herein.

The Ziegler-Natty catalysts may be formed by methods generally including contacting an alkyl magnesium compound with an alcohol to form a magnesium dialkoxide compound. Such reaction may occur at a reaction temperature ranging from room temperature to about 90° C. for a time of up to about 10 hours, for example. The alcohol may be added to the alkyl magnesium compound in an equivalent of from about 0.5 to about 6 or from about 1 to about 3, for example.

The alkyl magnesium compound may be represented by the following formula:

$$MgR^1R^2;$$

wherein $R^1$ and $R^2$ are independently selected from $C_1$ to $C_{10}$ alkyl groups. Non-limiting illustrations of alkyl magnesium compounds include butyl ethyl magnesium (BEM), diethyl magnesium, dipropyl magnesium and dibutyl magnesium, for example.

The alcohol may be represented by the formula:

$$R^3OH;$$

wherein $R^3$ is selected from $C_2$ to $C_{20}$ alkyl groups. Non-limiting illustrations of alcohols generally include butanol, isobutanol and 2-ethylhexanol, for example.

The methods may then include contacting the magnesium dialkoxide compound with a first agent to form reaction product "A". Such reaction may occur in the presence of an inert solvent. A variety of hydrocarbons can be used as the inert solvent, but any hydrocarbon selected should remain in liquid form at all relevant reaction temperatures and the ingredients used to form the supported catalyst composition should be at least partially soluble in the hydrocarbon. Accordingly, the hydrocarbon is considered to be a solvent herein, even though in certain embodiments the ingredients are only partially soluble in the hydrocarbon.

Suitable hydrocarbon solvents include substituted and unsubstituted aliphatic hydrocarbons and substituted and unsubstituted aromatic hydrocarbons. For example, the inert solvent may include hexane, heptane, octane, decane, toluene, xylene, dichloromethane, chloroform, 1-chlorobutane or combinations thereof, for example.

The reaction may further occur at a temperature of from about 0° C. to about 100° C. or from about 20° C. to about 90° C. for a time of from about 0.2 hours to about 24 hours or from about 1 hour to about 4 hours, for example.

Non-limiting examples of the first agent are generally represented by the following formula:

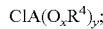

wherein A is selected from titanium, silicon, aluminum, carbon, tin and germanium, $R^4$ is selected from $C_1$ to $C_{10}$ alkyls, such as methyl, ethyl, propyl and isopropyl, x is 0 or 1 and y is the valence of A minus 1. Non-limiting illustrations of first agents include chlorotitaniumtriisopropoxide $ClTi(O^iPr)_3$ and $ClSi(Me)_3$, for example.

The methods may then include contacting reaction product "A" with a second agent to form reaction product "B". Such reaction may occur in the presence of an inert solvent. The inert solvents may include any of those solvents previously discussed herein, for example. The reaction may further occur at a temperature of from about 0° C. to about 100° C. or from about 20° C. to about 90° C. for a time of from about 0.2 hours to about 36 hours or from about 1 hour to about 4 hours, for example.

The second agent may be added to reaction product "A" in an equivalent of from about 0.5 to about 5, or from about 1 to about 4 or from about 1.5 to about 2.5, for example.

The second agent may be represented by the following formula:

wherein $R^5$ is selected from $C_2$ to $C_{20}$ alkyl groups. Non-limiting illustrations of second agents include blends of titanium chloride and titanium alkoxides, such as $TiCl_4/Ti(OBu)_4$. The blends may have an equivalent of $TiCl_4:Ti(OR^5)_4$ of from about 0.5 to about 6 or from about 2 to about 3, for example.

The method may then include contacting reaction product "B" with a third agent to form reaction product "C". Such reaction may occur in the presence of an inert solvent. The inert solvents may include any of those solvents previously discussed herein, for example. The reaction may further occur at room temperature, for example.

Non-limiting illustrations of third agents include metal halides. The metal halides may include any metal halide known to one skilled in the art, such as titanium tetrachloride ($TiCl_4$), for example. The third agent may be added in a equivalent of from about 0.1 to about 5, or from about 0.25 to about 4 or from about 0.45 to about 2.5, for example.

The method may further include contacting reaction product "C" with a fourth agent to form reaction product "D". Such reaction may occur in the presence of an inert solvent. The inert solvents may include any of those solvents previously discussed herein, for example. The reaction may further occur at room temperature, for example.

The fourth agent may be added to the reaction product "C" in an equivalent of from about 0.1 to about 5, or from about 0.25 to about 4 or from about 0.45 to about 2.0, for example.

Non-limiting illustrations of fourth agents include metal halides. The metal halides may include any metal halide previously described herein.

The method may then include contacting reaction product "D" with a fifth agent to form the catalyst component. The fifth agent may be added to the reaction product "D" in an equivalent of from about 0.1 to about 2 or from 0.5 to about 1.2, for example.

Non-limiting illustrations of fifth agents include organoaluminum compounds. The organoaluminum compounds may include aluminum alkyls having the following formula:

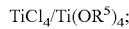

wherein $R^6$ is a $C_1$ to $C_{10}$ alkyl compound. Non-limiting illustrations of the aluminum alkyl compounds generally include trimethyl aluminum (TMA), triisobutyl aluminum (TIBAl), triethyl aluminum (TEAl), n-octyl aluminum and n-hexyl aluminum, for example.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, 4-methyl-1-pentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, norbornadiene, isobutylene, isoprene, vinylbenzycyclobutane, styrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen (or other chain terminating agents, for example) may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any suitable method, such as via a double-jacketed pipe or heat exchanger, for example. Alternatively, other types of polymerization processes may be used, such as stirred reactors in series, parallel or combinations thereof, for example.

In one or more embodiments, the polymerization process includes the production of multi-modal polyolefins. As used herein, the term "multi-modal process" refers to a polymerization process including a plurality of reaction zones (e.g., at least two reaction zones) that produce a polymer exhibiting a multi-modal molecular weight distribution. As used herein, a single composition including a plurality of molecular weight peaks is considered to be a "multi-modal" polyolefin. For example, a single composition including, at least one identifiable high molecular weight fraction and at least one identifiable low molecular weight fraction is considered a "bimodal" polyolefin.

The multi-modal polyolefins may be formed via any suitable method, such as via a plurality of reactors in series. The reactors can include any reactors or combination of reactors, as described above. In one or more embodiments, the same catalyst is utilized in the plurality of reactors. In another embodiment, different catalysts are used in the plurality of reactors. In the preparation of bi-modal polymers, the high molecular weight fraction and the low molecular weight fraction can be prepared in any order in the reactors, e.g., the low molecular weight fraction may be formed in the first reactor and the high molecular weight fraction in the second reactor, or vice versa, for example.

The high molecular weight fraction exhibits a molecular weight that is greater than the molecular weight of the low molecular weight fraction. The high molecular weight fraction may have a molecular weight of from about 50,000 to about 10,000,000, or from about 60,000 to about 5,000,000 or from about 65,000 to about 1,000,000, for example. In contrast, the low molecular weight fraction may have a molecular weight of from about 500 to about 50,000, or from about 525 to about 40,000 or from about 600 to about 35,000, for example.

The bimodal polymers may have a ratio of high molecular weight fraction to low molecular weight fraction of from about 80:20 to about 20:80, or from about 70:30 to about 30:70 of from about 60:40 to about 40:60, for example.

Upon removal from the reactor, the polymer may be passed to a polymer recovery system for further processing, such as addition of additives and/or extrusion, for example. In one or more embodiments, the polymer is contacted with a secondary stabilizer to form a modified polyethylene. The contact (i.e., modification) may occur in the polymer recovery system or in another manner known to one skilled in the art.

The secondary stabilizer generally includes a diphosphite. In one or more specific embodiments, the secondary stabilizer is selected from bis(2,4-di-tert-butylphenyl)pentaerythritol diphosphite, bis(phenyl)pentaerythritol diphosphite, bis(2,6-di-tert-butyl-4-methylphenyl)pentaerythritol diphosphite, bis(2,4-cumylphenyl)pentaerythritol diphosphite, 2,4,5-tri-t-butylphenyl 2-butyl-2-ethyl-1,3-propanediol phosphate and combinations thereof. For example, in one embodiment the secondary stabilizer is bis(2,6-di-tert-butyl-4-methylphenyl) pentaerythritol diphosphite. The secondary stabilizer may contact the ethylene based polymer in an amount of from about 100 ppm to about 1500 ppm, or from about 500 ppm to about 1300 ppm or from about 750 ppm to about 1250 ppm, for example.

In one or more embodiments, the ethylene based polymer is further contacted with a primary stabilizer to form the modified polyethylene. In one or more embodiments, the primary stabilizer includes a sterically hindered phenol, such as a thiobisphenol, alkylidene-bisphenol, alkylphenol, hydroxybenzyl compound, acylaminophenols, hydroxyphenylpropionates, or a secondary aromatic amine, for example. The primary stabilizer may contact the ethylene based polymer in an amount of from about 100 ppm to about 5000 ppm, or from about 500 ppm to about 3000 ppm, for example.

In one or more embodiments, the primary stabilizer and secondary stabilizer are blended with one another prior to contact with the ethylene based polymer.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene and polypropylene copolymers, for example.

Unless otherwise designated herein, all testing methods are the current methods at the time of tiling.

In one or more embodiments, the polymers include ethylene based polymers. As used herein, the term "ethylene based" is used interchangeably with the terms "ethylene polymer" or "polyethylene" and refers to a polymer having at least about 50 wt. %, or at least about 70 wt. %, or at least about 75 wt. %, or at least about 80 wt. %, or at least about 85 wt. % or at least about 90 wt. % polyethylene relative to the total weight of polymer, for example.

The ethylene based polymers may have a density (as measured by ASTM D-792) of from about 0.86 g/cc to about 0.98 g/cc, or from about 0.88 g/cc to about 0.965 g/cc, or from about 0.90 g/cc to about 0.965 g/cc or from about 0.925 g/cc to about 0.97 g/cc, for example.

The ethylene based polymers may have a melt index ($MI_2$) (as measured by ASTM D-1238) of from about 0.01 dg/min to about 100 dg/min., or from about 0.01 dg/min. to about 25 dg/min., or from about 0.03 dg/min. to about 15 dg/min. or from about 0.05 dg/min. to about 10 dg/min, for example.

Such ethylene based polymers may have a molecular weight distribution of from about 1.5 to about 30 or from about 5 to about 25, for example.

In one or more embodiments, the polymers include low density polyethylene.

In one or more embodiments, the polymers include linear low density polyethylene.

In one or more embodiments, the polymers include medium density polyethylene. As used herein, the term "medium density polyethylene" refers to ethylene based polymers having a density of from about 0.92 g/cc about 0.94 g/cc or from about 0.926 g/cc to about 0.94 g/cc, for example.

In one or more embodiments, the polymers include high density polyethylene. As used herein, the term "high density polyethylene" refers to ethylene based polymers having a density of from about 0.94 g/cc to about 0.97 g/cc, for example.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheets, such as thermoformed sheets (including profiles and plastic corrugated cardboard), geomembranes and pond liners, for example. Molded articles include single and multi-layered constructions in the form of bottles, tanks, large hollow articles, rigid food containers and toys, for example.

In one or more embodiments, the polymers are utilized to form pipe articles. For example, the pipe articles may include pipe, tubing, molded fittings, pipe coatings and combinations therefore. The pipe articles may be utilized in industrial/chemical processes, mining operations, gas distribution, potable water distribution, gas and oil production, fiber optic conduit, sewer systems and pipe relining, for example. In one or more specific embodiments, the pipe articles include gas distribution pipes.

Gas pipe specifications require an "inner wall ductility" to maintain a thermal stability (as measured via Oxidative Induction Temperature per ASTM D3350) of at least 220° C. for formed gas pipes. See, ASTM D2513. As used herein, the term "ductility" refers to the ability of a material, herein a polymer, to undergo deformation without failure. Such a requirement is intended to prevent brittle pipe failure due to degradation in the inner wall polymer. The inner wall polymer is especially susceptible to brittle pipe failure due to its' tendency to remain hot and its' continual exposure to oxygen.

Large diameter pipes (e.g., pipes having a diameter of at least about 8 inches, or from about 8 inches to about 72 inches), such as those utilized for gas pipe, generally include larger wall thicknesses. Prior efforts to improve properties of such pipe articles have included utilizing ethylene based polymers, and limited use of bimodal ethylene based polymers. However, when forming larger diameter pipes, bimodal ethylene based polymers may experience difficulty meeting the gas pipe specifications, specifically relating to thermal stability. Such difficulties can require processing throughput reductions (as a slower production time provides for cooler melt temperatures), thereby making the polymer uneconomical for such use.

In contrast, embodiments of the invention provide for pipe articles capable of providing a thermal stability (as measured via Oxidative Induction Temperature per ASTM D3350) of 260° C. or greater without the necessity of reducing pipe production throughput.

EXAMPLES

Bimodal high density polyethylene (HDPE having an $MI_2$ of 0.07 dg/min. and a density of 0.948 g/cc) was compounded using a Brabender Extruder. Sample 1 included the Bimodal HDPE additivized with two anti-oxidants (HDPE 1). Sample 2 included the composition of Sample 1 plus 500 ppm of bis(2,6-di-tert-butyl-4-methylphenyl)pentaerythritol diphosphite, commercially sold as U627A (Material 1). Sample 3 included the composition of Sample 1 plus 1000 ppm of U627A (Material 2). HDPE 2 is a commercial HDPE, $MI_2$ of 0.07 dg/min. and a density of 0.948 g/cc.

Each sample was tested via oxidative testing at 210° C., 220° C., 230° C. and 240° C. using oxygen and the time before onset of rapid thermal oxidation (OIT time) was monitored. This time interval is called the induction period. The end of induction is signaled by an abrupt increase in a sample's evolved heat. FIG. 1 illustrates a plot showing the oxidative test temperature, expressed as 1000/T, where T is the temperature expressed as degree Kelvin minus one (K−1), versus the Log of the OIT time. The plot illustrates that Materials 1 and 2 show superior stability (longer times) versus two high density ethylenes (HDPE 1 and 2).

The plot indicates that the additional diphosphite significantly increased the thermal stability of the HDPE.

While the foregoing is directed to embodiments of the present invention, other and further embodiments of the invention may be devised without departing from the basic scope thereof and the scope thereof is determined by the claims that follow.

What is claimed is:

1. A method of forming pipe comprising:
providing an ethylene based polymer, wherein the ethylene based polymer is formed by a Ziegler-Natta catalyst formed by:

contacting an alkyl magnesium compound with an alcohol to form a magnesium dialkoxide compound;
contacting the magnesium dialkoxide compound with a plurality of first agents to form reaction product "A";
contacting reaction product "A" with a second agent to form reaction product "B", wherein the second agent comprises a transition metal and a halogen;
contacting reaction product "B" with a third agent to form reaction product "C", wherein the third agent comprises a first metal halide and wherein the third agent is a stronger halogenating agent than the second agent;
contacting reaction product "C" with a fourth agent to form reaction product "D", wherein the fourth agent comprises a second metal halide and wherein the fourth agent is a stronger halogenating agent than the third agent; and
contacting reaction product "D" with fifth agent to form a Ziegler-Natta catalyst component, wherein the fifth agent comprises an organoaluminum compound;
contacting the ethylene based polymer with a secondary stabilizer comprising a diphosphite to form a modified polyethylene; and
forming the modified polyethylene into a pipe.

2. The method of claim 1, wherein the pipe comprises a diameter of at least 8 inches and an Oxidative Induction Time (OIT) of at least 30 minutes at 230° C.

3. The method of claim 1 further comprising contacting the ethylene based polymer with a primary stabilizer to form the modified polyethylene.

4. The method of claim 1, wherein the pipe is a gas distribution pipe and the method further comprises flowing a gas through the gas distribution pipe.

5. The method of claim 4, wherein the gas is selected from fuel gas and natural gas.

6. The method of claim 1, wherein the ethylene based polymer exhibits a bimodal molecular weight distribution.

7. The method of claim 1, wherein the ethylene based polymer is a homopolymer.

8. The method of claim 1, wherein the ethylene based polymer is formed in a plurality of loop reactors in series.

9. The method of claim 1, wherein the ethylene based polymer comprises high density polyethylene.

10. The method of claim 1, wherein the secondary stabilizer is selected from trisarylphosphite, bis(2,4-di-tert-butylphenyl)pentaerythritol diphosphite, bis(phenyl)pentaerythritol diphosphite, bis(2,6-di-tert-butyl-4-methylphenyl)pentaerythritol diphosphite, bis(2,4-cumylphenyl)pentaerythritol diphosphite, 2,4,5-tri-t-butylphenyl 2-butyl-2-ethyl-1,3-propanediol phosphate and combinations thereof.

11. The method of claim 1, wherein the secondary stabilizer is selected from the group consisting of unsubstituted bis(phenyl)pentaerythritol diphosphite, bis(2,4-cumylphenyl)pentaerythritol diphosphite, 2,4,5-tri-t-butylphenyl 2-butyl-2-ethyl-1,3-propanediol phosphate, and combinations thereof.

12. The method of claim 3, wherein the primary stabilizer comprises a sterically hindered phenol.

13. The method of claim 3, wherein the primary stabilizer is selected from thiobisphenol, alkylidene-bisphenol, alkylphenol, hydroxybenzyl compounds, acylaminophenols, hydroxyphenylpropionates, secondary aromatic amines and combinations thereof.

14. The method of claim 1, wherein the ethylene based polymer is contacted with from about 500 ppm to about 5000 ppm of the secondary stabilizer.

15. The method of claim 3, wherein the ethylene based polymer is contacted with from about 100 ppm to about 5000 ppm of the primary stabilizer.

16. The method of claim 3, wherein the primary stabilizer and secondary stabilizer are blended with one another prior to contact with the ethylene based polymer.

17. A method of forming pipe comprising:
providing an ethylene based polymer, wherein the ethylene based polymer is formed by a Ziegler-Natta catalyst formed by:
contacting an alkyl magnesium compound with an alcohol to form a magnesium dialkoxide compound;
contacting the magnesium dialkoxide compound with a plurality of first agents to form reaction product "A";
contacting reaction product "A" with a second agent to form reaction product "B", wherein the second agent comprises a transition metal and a halogen;
contacting reaction product "B" with a third agent to form reaction product "C", wherein the third agent comprises a first metal halide and wherein the third agent is a stronger halogenating agent than the second agent;
contacting reaction product "C" with a fourth agent to form reaction product "D", wherein the fourth agent comprises a second metal halide and wherein the fourth agent is a stronger halogenating agent than the third agent; and
contacting reaction product "D" with fifth agent to form a Ziegler-Natta catalyst component, wherein the fifth agent comprises an organoaluminum compound;
contacting the ethylene based polymer with an anti-oxidant, a primary stabilizer and a secondary stabilizer to form modified polyethylene, wherein the secondary stabilizer is selected from the group consisting of unsubstituted bis(phenyl)pentaerythritol diphosphite, bis(2,4-cumylphenyl)pentaerythritol diphosphite, 2,4,5-tri-t-butylphenyl 2-butyl-2-ethyl-1,3-propanediol phosphate and combinations thereof; and
forming the modified polyethylene into a pipe, wherein the pipe comprises a diameter of at least 8 inches and an Oxidative Induction Time (OIT) of at least 30 minutes at 230° C.

18. The method of claim 17, wherein the ethylene based polymer comprises at least a first ethylene based polymer and a second ethylene based polymer and the first ethylene based polymer is absent the secondary stabilizer.

19. The method of claim 3, wherein the primary stabilizer is selected from alkylidene-bisphenol, alkylphenol, acylaminophenols, secondary aromatic amines and combinations thereof.

20. The method of claim 1, wherein the ethylene based polymer exhibits a bimodal molecular weight distribution and comprises a high molecular weight fraction and a low molecular weight fraction, wherein the high molecular weight fraction exhibits a molecular weight of from 50,000 to 10,000,000, and wherein the low molecular weight fraction exhibits a molecular weight of from 500 to 50,0000.

* * * * *